Aug. 23, 1955 T. A. SMITH 2,715,886
INTEGRAL LIGHTING FOR AIRCRAFT INSTRUMENTS
Filed Dec. 16, 1952 3 Sheets-Sheet 1

INVENTOR
Thomas A Smith.
BY Herbert M. Birch
ATTORNEY

Aug. 23, 1955 T. A. SMITH 2,715,886
INTEGRAL LIGHTING FOR AIRCRAFT INSTRUMENTS
Filed Dec. 16, 1952 3 Sheets-Sheet 2

INVENTOR
*Thomas A. Smith.*
BY *Herbert M. Birch*
ATTORNEY

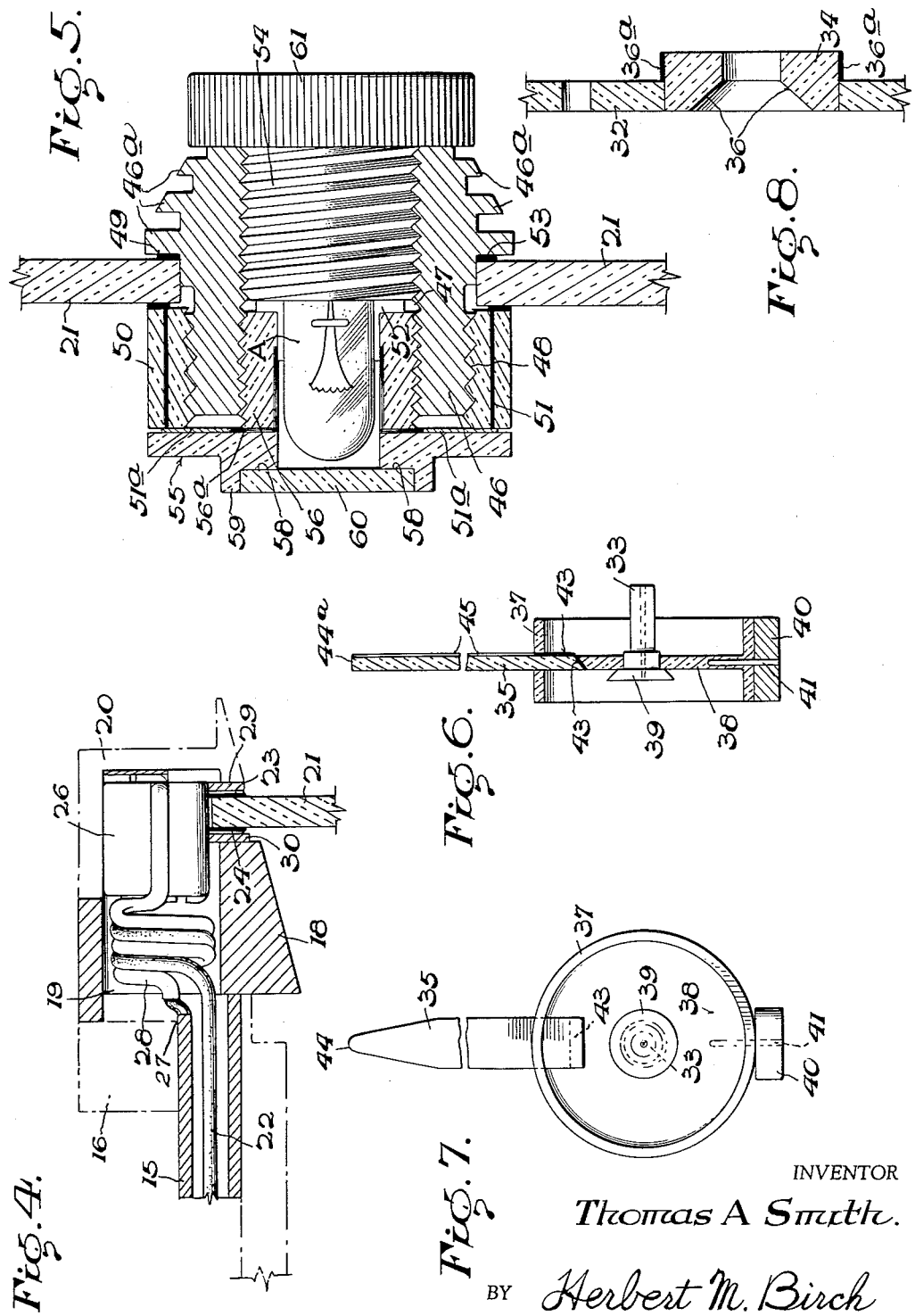

United States Patent Office 2,715,886
Patented Aug. 23, 1955

2,715,886

INTEGRAL LIGHTING FOR AIRCRAFT INSTRUMENTS

Thomas A. Smith, Wilmington, Del., assignor, by mesne assignments, to All American Engineering Company, Wilmington, Del., a corporation of Delaware Application December 16, 1952, Serial No. 326,185

2 Claims. (Cl. 116—129)

The present invention relates to instrument dial and pointer illumination.

One object of the present invention is to reduce glare to a minimum and thereby relieve eye strain. Prior instrument lighting systems illuminate too much unnecessary dial area whereas it is only desired to make visible the dial indicia per se and the instrument indicating pointer. With too much dial illumination the resulting glare tends to injure the eye and to disturb the nervous system, cause discomfort and fatigue, thereby reducing the efficiency of the individual for his duties as a pilot or the like.

Accordingly another object of this invention is to centrally locate a source of light at the most effective position for selective instrument pointer and indicia illumination.

Another object is to transmit light rays for dial character illumination solely through a light transmitting pointer.

Another object is to provide novel means for removably mounting a light bulb in an exteriorly open bulb socket in the center of an instrument sealing electrically conducting transparent plate positioned in the instrument casing over the dial face and a light transmitting pointer of a condition responsive instrument.

Still another object is to provide a special floating contact plug for connecting to the current conducting glass plate which supports the exteriorly open bulb socket thereby eliminating all conducting wire leads across the dial face to the bulb.

A further object is to provide a novel light rays sealing pointer mount and cooperating compound device for filtering and for hermetically sealing the instrument casing at the base of the exteriorly open bulb socket.

A further object is to provide a novel light transmitting pointer of plastex material formed with a prism and a light rays projecting radius pointer tip.

Still another specific object is to provide an instrument sealing and lighting arrangement for condition responsive instruments, such as used in aircraft having a suitable condition responsive mechanism, a casing and an indicia inscribed dial, said arrangement comprising a current conducting transparent cover sealed to the casing over the dial, said cover being formed with a central opening for a light bulb socket, the bottom of the bulb socket protruding toward the dial from the interior of the cover and being sealed with a filter plate, a light rays sealing pointer wheel with a rim shrouding the protruding part of the socket with the filter, and a light transmitter arm with a radius tip radiating from the wheel, said arm being formed with a prism for transmittal of light to the tip of the arm at the dial indicia.

With these and other objects in view, the invention consists in the construction, arrangement and combination of parts hereinafter described and particularly defined in the claims, it being understood that it is not intended to limit the same to the details of construction. In the drawings like parts throughout the several figures are given like numerals and are thus identified in the following detailed description:

Figure 4 is a cross section view taken on the line 4—4 of Figure 2.

Figure 5 is an enlarged cross section view of the electric light bulb and socket shown in Figure 1.

Figure 6 is a detailed view in longitudinal cross section of the pointer, pointer wheel and reflecting prism.

Figure 7 is a top plan view of the pointer, pointer wheel and prism.

Figure 8 is a cross sectional detail of a plastic dial insert through which extends the pointer spindle shown in the assembled view in Figure 1.

Figure 1:
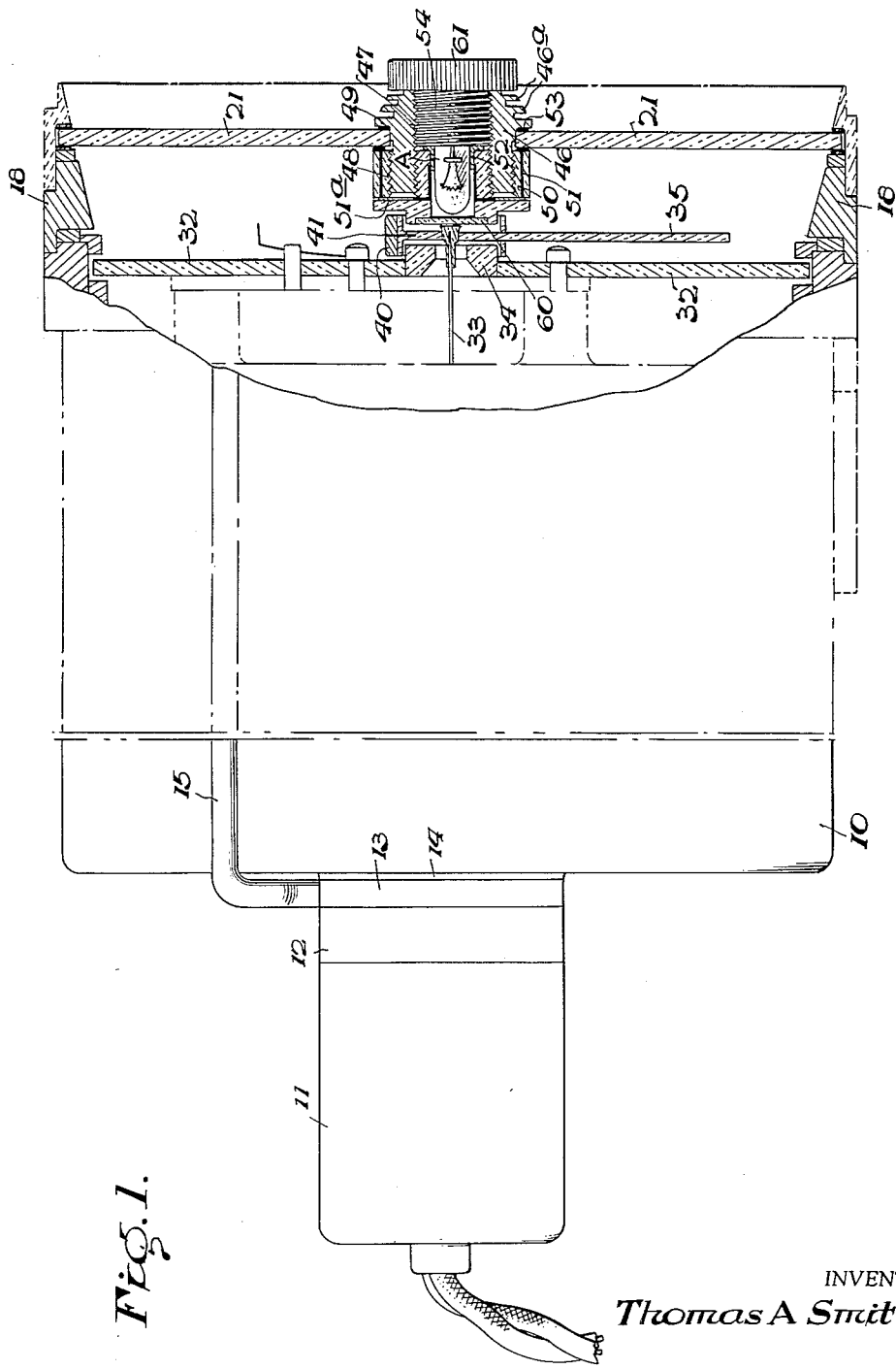
Figure 1 is a side elevation view with the dial portion in cross section of an instrument casing and the novel light bulb mounting and light rays transmitting system.
Figure 3:
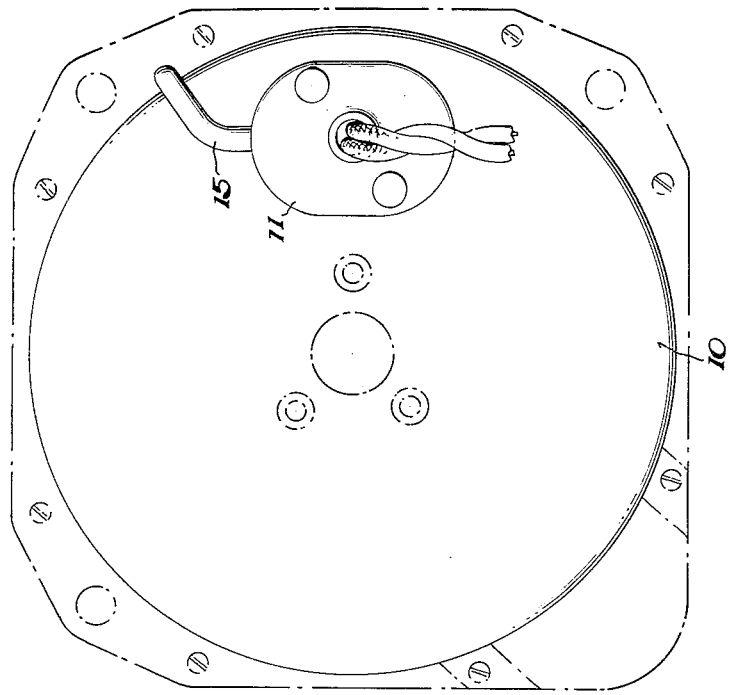
Figure 3 is a rear end view of the casing and master terminal plug.

Referring to the drawings and first with particular reference to Figure 1, there is illustrated a condition responsive instrument, such for example as a rate of climb mechanism comprising a sealed casing 10 with a suitable electric master plug 11, terminal 12 for the plug and conducting spacer ring 13 mounted in the rear wall of the casing. The spacer ring 13 is insulated from the casing 10 by insulator ring 14. Connected to the ring 13 is a copper current conductor tube 15 extending longitudinally along the exterior side of the casing and through an opening in the bezel supporting flanged rim 16 of the casing to the top surface of the flange where it is leveled off flush to permit proper fitting thereon of a bezel spacer ring 18 (see Figure 4). This spacer ring 18 is bored through to form an opening, which cooperates to form a chamber 19 when the bezel 20 is suitably mounted over the spacer ring 18 to hold a transparent electric current conducting plate 21. The plate is formed of a suitable conducting glass, such as described in Patents 2,566,346; 2,569,773 or 2,557,983; and centrally mounts a light source, such as a miniature bulb A hereafter described.

The chamber 19 is directly above the open flush end of copper tubing 15, which tubing is connected to current conducting spacer 13 from one side of the electric circuit through the master power plug, while the bore of the tubing serves as a conduit for an insulated lead 22 from the other side of the power circuit through the master plug to energize a contact 23 of a novel auxiliary contact plug 26. The second contact 24 of the plug is suitably connected to a slightly countersunk top edge 27 of the copper tubing 15 by a second lead 28 (see Figure 4). The contacts 23 and 24 of the plug 26 project laterally from the auxiliary plug in spaced apart relation so as to clamp over the edge of the transparent conductor plate 21 and remain in current conducting contact with the upper and lower conducting faces thereof. This plate is mounted between yieldable insulating gaskets 29 and 30 and respectively superimposed on their respective adjacent contacts 23 and 24. For example, the lower gasket 30 is positioned between the bezel spacer 18 and the lower contact 24, which contacts the interior or dial side of the plate 21, while the upper gasket is positioned between the bezel 20 and the upper contact 23, which contacts the exterior or top side of the plate 21. As the plate 21 is yieldably movable between the gaskets, it follows that yielding movements thereof will cause movement to be imparted to the auxiliary contact plug 26, thereby providing a floating contact plug. It of course is understood that the contact plug chamber 19 is large enough to give clearance for such floating action. The floating action of the glass plate is important to prevent breakage under varying pressure conditions to which the glass is subjected during use.

Figure 2:
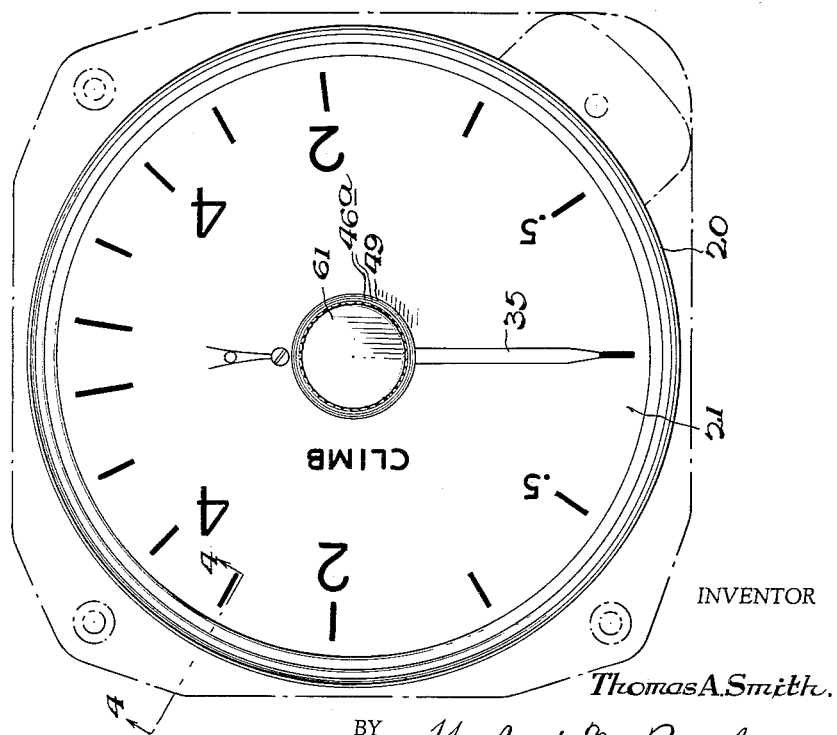
Figure 2 is a front view of the instrument looking in the direction of the dial face thereof.

Referring to Figure 1, interiorly mounted below or back of the conducting plate 21 in spaced parallel relation is a centrally apertured dial plate 32 with suitable indicia characters such as the indicating numerals inscribed thereon in Figure 2. The dial plate is fastened to the usual lugs carried by the interior condition responsive mechanism frame of the instrument, which includes a known pointer linkage, not shown, connected to a pointer spindle 33. The spindle projects through the central aperture of the dial and the bore of a relatively thicker plastic bushing 34 mounted in the dial aperture to support an instrument pointer 35 formed of light conducting plastex material. The pointer tip swings in indicating position over the dial face. When referring to plastics or plastex material, any suitable high polymer product is intended, which will transmit light rays. The plastic bushing 34 is flush with the rear interior surface of the dial plate and conically counterbored to form an annular light reflecting prism 36 adapted to transmit light rays through the plastic dial plate to each numeral.

The bushing is relatively thicker than the thickness of the dial plate so as to project an annular portion 36a beyond the face of the dial (see Figure 8). This portion is light sealed by a black vinyl coating embraced or shrouded by the rim 37 of pointer wheel or hub 38 fixed on the free end of the projecting pointer spindle 33 by a retaining collet 39 or the like (see Figures 1 and 6).

The pointer wheel is of plastic and the rim 37 has a counterweight 40 fastened to it by a pin 41 diametrically opposite to the plastex light conducting pointer 35 as shown in Figures 6 and 7. The pointer 35 fits into the wheel through a slot in the rim 37 and is bevelled to form a prism 43 coated with the silver reflector substance 44 and is positioned with respect to the source of light A hereinafter described, to thereby reflect and cause transmittal of light rays along the pointer to the radius light projecting tip 44a thereof. This radius tip serves to produce a curved reflecting surface to project a lighting spot from the end of the pointer on the adjacent dial indicia, to thereby selectively illuminate said indicia and leave the remainder of the dial black. The plastex pointer is preferably coated with a white paint 45 on the side away from the dial and facing the light source A to improve the light reflection and transmittal from prism 43 and to give high visibility by daylight (see Figure 6).

The light bulb socket structure

An important feature of this invention is the mounting of a novel light bulb socket structure in the center of the conducting plate 21 and the novel hermetic sealing of the socket with a plate and filter at the bottom so that defective light bulbs may be replaced at any time without impairing the instrument mechanism by varying ambient atmospheric pressures (see Figure 5). The socket comprises a conducting lamp bushing 46 with an interiorly threaded bore 47 and an exteriorly threaded outer circumference 48 formed with an annular stop or shoulder 49 contacting the exterior current conducting surface of plate 21. This lamp bushing 46 is formed with heat radiating fins 46a and is locked in the opening in conducting plate 21 by an internally threaded conducting bushing 50 threaded over the exterior threads of the lamp bushing 46 and when threaded tight the rim thereof is forced against the plate 21 in a position opposite to the shoulder 49 on the other current conducting side of the plate. The bushing 50 is formed of plastic but has sealed within it a tinned copper wire 51 connected through a silver washer 51a and a second tinned copper wire later described to a bulb contactor ring 52 engaged with the metal base of the bulb A and at the other end with the interior current conducting surface of the conductor plate 21 energized from lower contact 24. The stop or shoulder 49 is of conducting material and electrically connected at 53 to the exterior conducting surface of plate 21. This surface is supplied with current from the upper contact 23 through the lamp bushing 46 to the threaded lamp base 54. Thus when the electric current is on and the lamp is screwed into the lamp bushing 46 the circuit is completed from each contact 23 and 24 through the plate 21 on one side of the circuit to the contact ring 52 on the other side of the circuit through the plate conducting surfaces to the lamp base 54 (see Figure 5).

The lamp contactor ring 52 is engaged by a plastic cap 55 formed with a sleeve 56 having a smooth bore and an exterior threaded circumference 57 threadable in the threaded bore of lamp bushing 46. Transversely through the wall of sleeve 56 is a second tinned copper lead 56a from the silver washer 51a to final connection with the lamp contactor ring 52.

The plastic cap 55 is counterbored to form a shoulder 58 and an annular flange 59, thereby providing a seat to receive and mount a light ray filter disk 60, preferably red. This disk 60 and the annular flange 59 are suitably hermetically sealed together and project within the rim 37 of the pointer wheel 38, said rim embracing or shrouding the filter disk and shoulder, thereby sealing in the light rays from bulb A projecting through the filter to the pointer prism 43.

The light source is a miniature bulb A well known in the instrument art and includes a knurled hand knob 61 insulated from the contactor ring 52 and connected to one bulb lead, not shown so that when threaded into the lamp bushing 46 the circuit is closed through the bulb filament. If the filament burns through then the bulb is quickly removable and replaceable without permitting any pressure or temperature change within the casing 10 because the filter disk 60 seals off the ambient exterior conditions.

Thus there is provided a novel dial indicia lighting system, wherein a bulb may be mounted at the center of a dial without interfering current conductors and which will permit the bulb to be changed without affecting the instrument operation at any altitude or temperature condition. Also, all light transmitted from the center light source is in a sealed path and through a light rays transmitting pointer of plastex material having a radius tip for projecting a concentrated light spot on the dial indicia selectively. Further the novel system of electric current supply to the bulb is through a single conducting transparent plate, thereby eliminating undesirable current leads in or across the dial plate for unimpaired vision thereof.

Without further description it is believed that the structures herein described and their respective and cooperative functions and organization are sufficiently clear to be understood by others skilled in the art. However, it is to be expressly understood that this description and disclosure is for example only and is not intended as a limitation in specific structural features and reference is to be had to the appended claims to determine the scope of the invention.

What I claim is:

1. Means for illuminating the indicia encircling an instrument dial and an indicating pointer movable over the dial in response to ambient conditions comprising a mechanism containing hermetically sealed casing, said dial being centrally apertured and mounted in the casing, a pointer spindle actuated by the casing mechanism projecting through the dial aperture, a pointer wheel with a rim secured to the end of the spindle, a pointer radially projecting from the wheel formed of light rays transmitting material extending at its tip over the said dial indicia, a prism formed in the pointer near the center of the wheel, a light supporting conducting plate having a light bulb and socket centrally mounted therein, said socket extending into the center of the pointer wheel, whereby the rays of light from the said bulb project from the said prism along the pointer to its tip, to thereby illuminate the dial indicia, and means encircling the said pointer spindle mounted in the dial aperture adapted to mask the light rays projected from the said prism, to thereby confine the rays to the light transmitting dial and pointer.

2. In an instrument lighting system, the combination of an instrument casing having a transparent current conducting window and a central aperture therein opening towards the front of the casing, an electric bulb socket with a threaded conducting means bushing therein connected to opposite inner and outer sides of the said conducting window, a dial with a scale therein visible through said window, a light rays conducting pointer movable over the dial having a light reflecting member, a lamp bulb having contact means adapted when in said socket to complete a lighting circuit thereto, said bulb being of a smaller diameter than said socket and being insertable from the front of said casing into said socket to emit light onto said reflecting member carried by said pointer, said threaded conducting bushing formed with heat radiation fins.

References Cited in the file of this patent

UNITED STATES PATENTS

| | | |
|---|---|---|
| 2,172,765 | Kollsman | Sept. 12, 1939 |
| 2,278,520 | Klein | Apr. 7, 1942 |
| 2,286,737 | Hills | June 16, 1942 |
| 2,287,605 | Dickson | June 23, 1942 |
| 2,328,485 | Ott | Aug. 31, 1943 |
| 2,429,420 | McMaster | Oct. 21, 1947 |
| 2,696,550 | Neugass | Dec. 7, 1954 |
| 2,702,340 | Thieblot | Feb. 15, 1955 |